United States Patent [19]
Lin et al.

[11] Patent Number: 5,189,543
[45] Date of Patent: Feb. 23, 1993

[54] INFRA-RED WIRELESS KEYBOARD SYSTEM

[75] Inventors: Steve Lin, Taiepi; Kent Kao, Keelung City; Robert Hsue, Hsing-Chuang City, all of Taiwan

[73] Assignee: Acer Incorporated, Taiwan

[21] Appl. No.: 615,567

[22] Filed: Nov. 19, 1990

[51] Int. Cl.$^5$ ............................................. H04B 10/00
[52] U.S. Cl. ..................................... 359/142; 359/154
[58] Field of Search ............... 455/603, 606, 617, 619; 359/142, 147, 154, 159, 182, 172

[56] References Cited

U.S. PATENT DOCUMENTS

| | | | |
|---|---|---|---|
| 4,628,541 | 12/1986 | Beavers | 455/617 |
| 4,897,821 | 1/1990 | Thierry et al. | 455/603 |
| 4,905,279 | 2/1990 | Nishio | 455/603 |
| 4,914,517 | 4/1990 | Duffield | 455/603 |

OTHER PUBLICATIONS

Infoworld, Jul. 17, 1989, Darrow, B. (359/172).
Photolink ™ RS-232, Photonics Corporation 1989. (359/172).

Primary Examiner—Edward L. Coles, Sr.
Assistant Examiner—Kinfe-Michael Negash
Attorney, Agent, or Firm—Greg T. Sueoka

[57] ABSTRACT

A communication system comprising a wireless keyboard for emitting infra-red signals, a receiving unit for converting the infra-red signals to an electrical signal, a tuning and amplifying circuit coupled to the receiving unit for tuning and amplifying the electrical signals, a carrier filtering circuit for removing the carrier component of the input signal, a single-shot circuit coupled to the carrier filtering circuit for converting its input signal to a known code wave form, and a microprocessor for receiving the code wave. The invention allows multiple users to operate their wireless keyboards without interference.

3 Claims, 3 Drawing Sheets

INFRA-RED WIRELESS KEYBOARD SYSTEM

BACKGROUND OF THE INVENTION

This invention is in the field of infra-red communications. More particularly, it relates to multi-user infra-red communication systems.

Methods and apparatus for emitting infra-red signals for use in wireless communication systems are known. One such system is shown in U.S. Pat. No. 4,628,541, the specification of which is incorporated herein for all purposes. Known infra-red wireless keyboard systems can accommodate multiple users with multiple channels. In operation, an ID code is combined with the signals transmitted by the wireless keyboard. This combined signal is then transmitted at a particular carrier frequency. The receiver, which is coupled to the computer system, can determine from the received ID code which channel the keyboard is using. Although this arrangement allows for multiple users, these multiple users cannot simultaneously access the computer without causing mutual interference. If two users were to attempt to input data simultaneously into their respective computer systems, the fact that the carrier frequencies are the same will result in the loss of the ID code and data to both systems.

As an example of the interference problem, assume two different users are transmitting to two separate computer systems, the first user transmitting on channel 1 and the second user transmitting on channel 2. Using known wireless keyboard systems, the first user can transmit data to the first computer system through channel 1, but if the second user attempts to transmit data simultaneously to the second system, both sets of data will be destroyed due to interference.

Given the limitations of the known wireless keyboard systems, a wireless keyboard that can transmit data simultaneously with other keyboards without interfering with them or being interfered with would be an advance of the known art.

SUMMARY OF THE INVENTION

In a preferred embodiment of the present invention, each channel is programmed with its own ID code and its own designated carrier frequency. Whenever a key is depressed, the key code and the ID code are transmitted according to the known RS 232 format at a designated frequency by an infra-red Light Emitting Diode ('LED'). The receiving unit receives the infra-red signal and outputs a corresponding electrical signal to a tuning and amplifying circuit for further processing. The processed signals are transmitted to a carrier filtering circuit which strips off the carrier and outputs the result to a single-shot circuit. The single-shot circuit converts the signals to a code wave of RS 232 type which is then sent to the microprocessor.

The carrier frequency is designated by the user, within a narrow band of frequencies. The ID codes and the carrier frequency associated with each channel is different. Thus, even if multiple users are transmitting simultaneously, the tuning circuit of the receiver can be set to a particular carrier frequency, rejecting simultaneously received signals having different carrier frequencies.

The invention will now be described in detail with reference to the figures listed and described below.

DESCRIPTION OF THE SPECIFIC EMBODIMENT(S)

Figure 1:
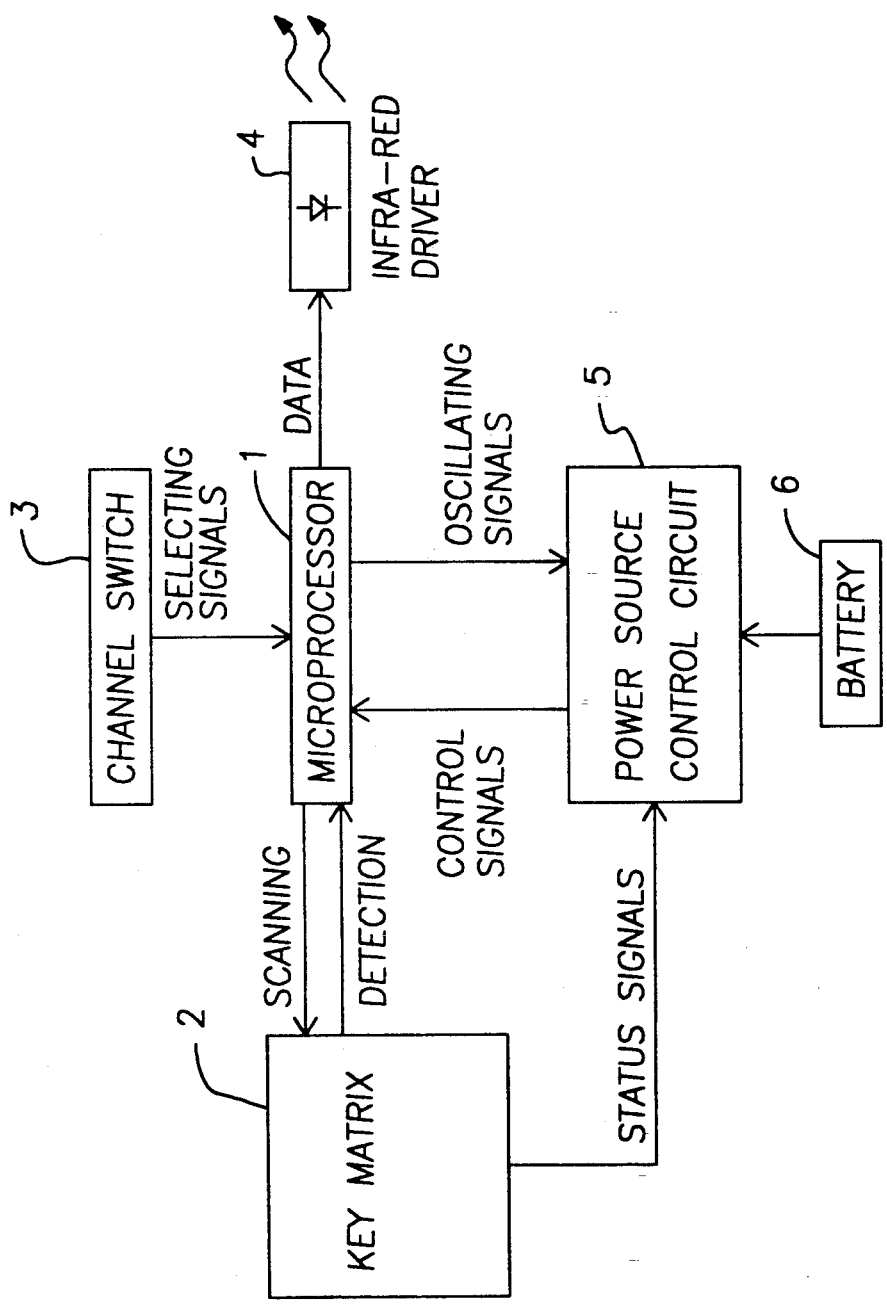
FIG. 1 is a block diagram of an infra-red wireless keyboard which incorporates the present invention.

FIG. 1 is a block diagram of an infra-red wireless keyboard/transmitter constructed according to the teaching of the present invention. It comprises microprocessor 1, key matrix 2, channel switch 3, infra-red driver 4, power source control circuit 5 and battery 6. Channel switch 3 allows a user to select and operate on a given channel with a carrier frequency preassigned by microprocessor 1.

In operation, microprocessor 1 sends scanning signals to key matrix 2 in order to detect the depression of one of the keys. If no keys are depressed, power source control circuit 5 places microprocessor 1 into a low-power standby mode. Control circuit 5 also resets microprocessor 1 if power is cut off, ensuring proper microprocessor operation in all cases. If a key has been depressed, control circuit 5 switches microprocessor 1 to a normal operating mode. Microprocessor 1 assigns a key code to the depressed key according to its position in the key matrix. Microprocessor 1 then references channel switch 3 to obtain the proper ID code, each channel having a predefined ID code. The ID code and the key code are then combined into a 2 byte data word by microprocessor 1. Software in microprocessor 1 then generates a carrier frequency preassigned to the selected channel by microprocessor 1. Microprocessor 1 transmits the 2 byte data word according to a known communications format such as RS 232, at the carrier frequency. Infra-red driver 4 emits the data through an infra-red LED.

Figure 2:
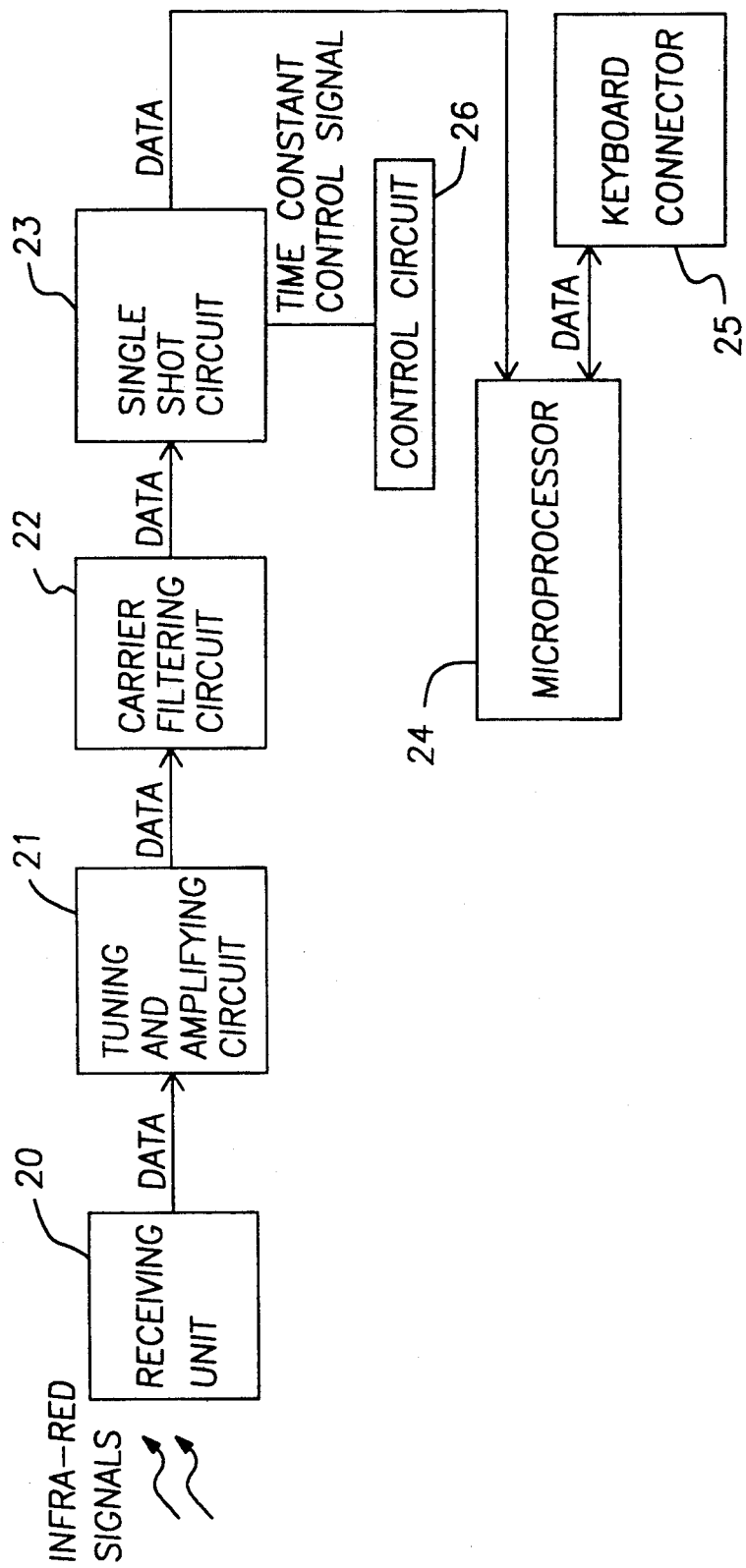
FIG. 2 is a block diagram of a receiver for receiving signals from the wireless keyboard, the receiver incorporating the present invention.

FIG. 2 shows a receiver of infra-red signals constructed according to the teachings of the present invention. It comprises receiving unit 20, tuning and amplifying circuit 21, carrier filtering circuit 22, single-shot circuit 23, and microprocessor 24.

Receiving unit 20 receives infra-red signals from infra-red driver 4 and outputs a corresponding electrical signal to tuning and amplifying circuit 21. If the carrier frequency of the received signal does not match the user-preset frequency designated by the tuning circuit, the received signal is rejected. If the carrier frequency of the received signal matches the preset frequency designated by the tuning circuit 21, the received signal is amplified by the amplifying circuit 21. The amplified signal is then sent to carrier filtering circuit 22 which strips off the carrier and sends the resulting signal to single-shot circuit 23. Single-shot circuit 23 converts its input into a code wave signal having a wave form of RS 232 type and sends this RS 232 wave to microprocessor 24. The width of the code wave pulse is controlled by the time constant control signals, generated by control circuit 26. Microprocessor 24 receives the ID code and data code outputted by single-shot circuit 23. If the ID code is correct, the data code will be received and sent to a computer system (not shown in FIG. 2) via keyboard connector 25. It should be noted that interference problems could occur with the present invention, if several users in the same area attempt to tune their transmitters and receivers to the same frequency. In this case, some procedure must be implemented to allocate the frequencies.

Figure 3:
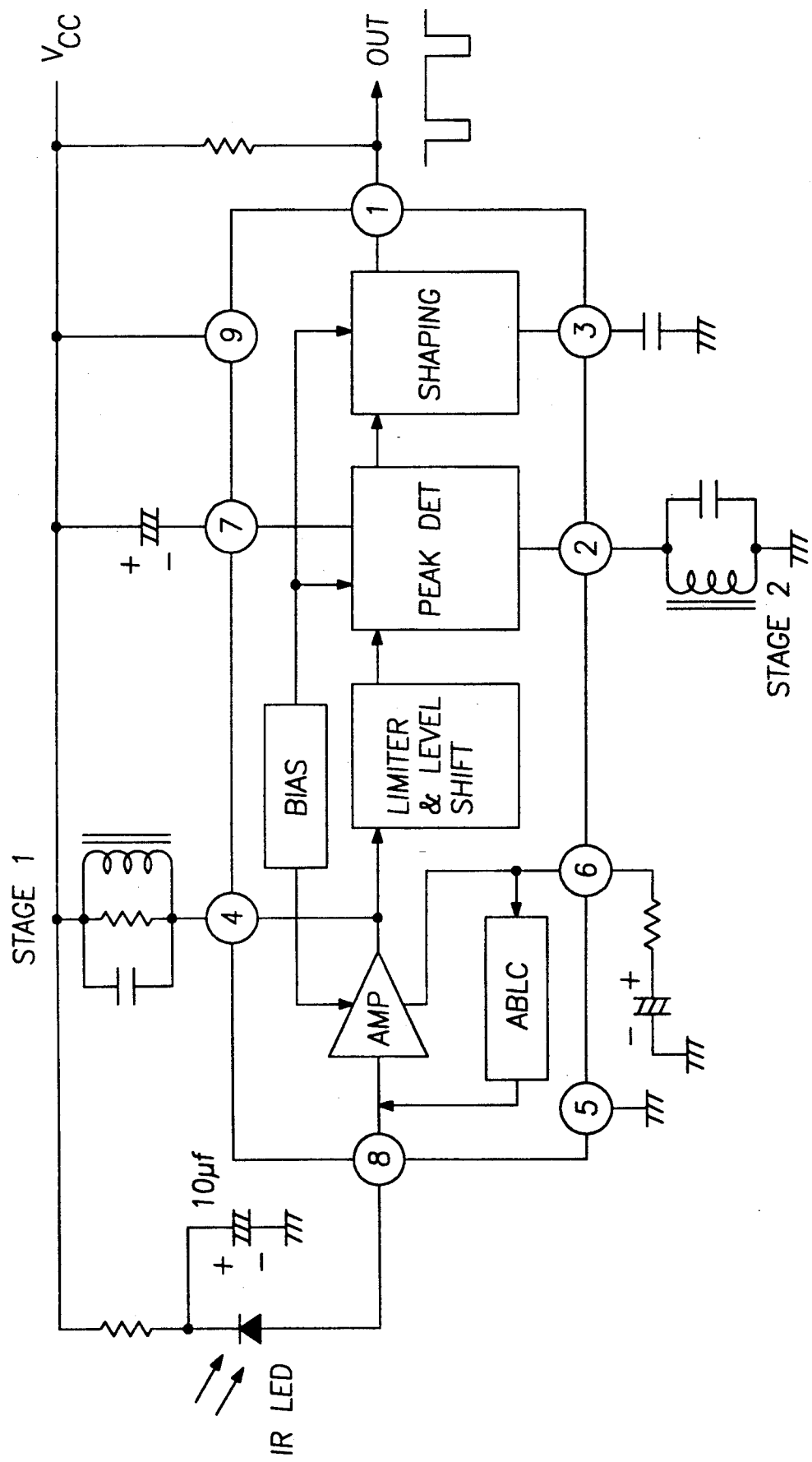
FIG. 3 is a detailed circuit diagram of the tuning, amplifying and carrier-filtering circuits shown in FIG. 2.

FIG. 3 shows the tuning and amplifying circuit 21 and carrier filter circuit 22 of FIG. 2 in greater detail. The functions of circuits 21 and 22 are performed by a NEC μPC 1474HA integrated circuit and two discrete tuning circuits. The output is provided on pin 1 of the integrated circuit, which is the output of carrier filtering circuit 22 in FIG. 2. The detailed description of the UPC 1474 HA is contained in a product specification appended hereto as Appendix A.

The present invention has now been described in a preferred embodiment. Various changes and modifications are readily envisioned and fully within the scope of the invention. For example other communications means other than an RS 232 communications means can be used. Additionally, the tuning and amplifying circuit of FIG. 2 could be duplicated in order to have a more accurate band pass function. Accordingly, the scope of the invention should be limited only by the breadth of the claims.

What is claimed is:

1. A communication system comprising:
   a wireless keyboard means for emitting infra-red signals, the infra-red signals comprising an ID code and data, the code and data being transmitted according to a predefined communication format at a user-selected carrier frequency, the wireless keyboard means including a channel switch circuit for user selection of the carrier frequency;
   a receiving means for receiving the infra-red signals and for converting the received signals to an electrical signal;
   a tuning and amplifying circuit means coupled to the receiving means, the tuning circuit capable of being tuned to a preset carrier frequency by the user, the tuning circuit receiving the electrical signal and transmitting it to the amplifying circuit if the carrier frequency of the electrical signal and the preset carrier frequency tuned on the tuning circuit means are the same, the amplifying circuit amplifying the electrical signal;
   a carrier filtering circuit means, coupled to the tuning and amplifying circuit means for filtering the carrier component of the electrical signal;
   single-shot circuit means coupled to the carrier filtering circuit means, the single-shot circuit means converting the demodulated electrical signal to a code wave signal compatible with a predefined communication signal protocol; and
   a microprocessor coupled to the single-shot circuit means for receiving said code wave signal and for determining if the ID code is correct.

2. The system of claim 1, wherein the tuning and amplifying circuit comprises a remote control preamplifier and at least one tuning circuit for allowing a user to select among a plurality of frequencies.

3. The system of claim 1, wherein said predefined communications format is the RS 232 signal protocol.

* * * * *